(No Model.) 2 Sheets—Sheet 1.

P. A. JUGE.
COIN CONTROLLED APPARATUS FOR DISPENSING LIQUIDS.

No. 540,497. Patented June 4, 1895.

WITNESSES:
William Goebel.

INVENTOR
P. A. Juge
BY
Munn & Co
ATTORNEYS.

(No Model.) 2 Sheets—Sheet 2.
P. A. JUGE.
COIN CONTROLLED APPARATUS FOR DISPENSING LIQUIDS.
No. 540,497. Patented June 4, 1895.
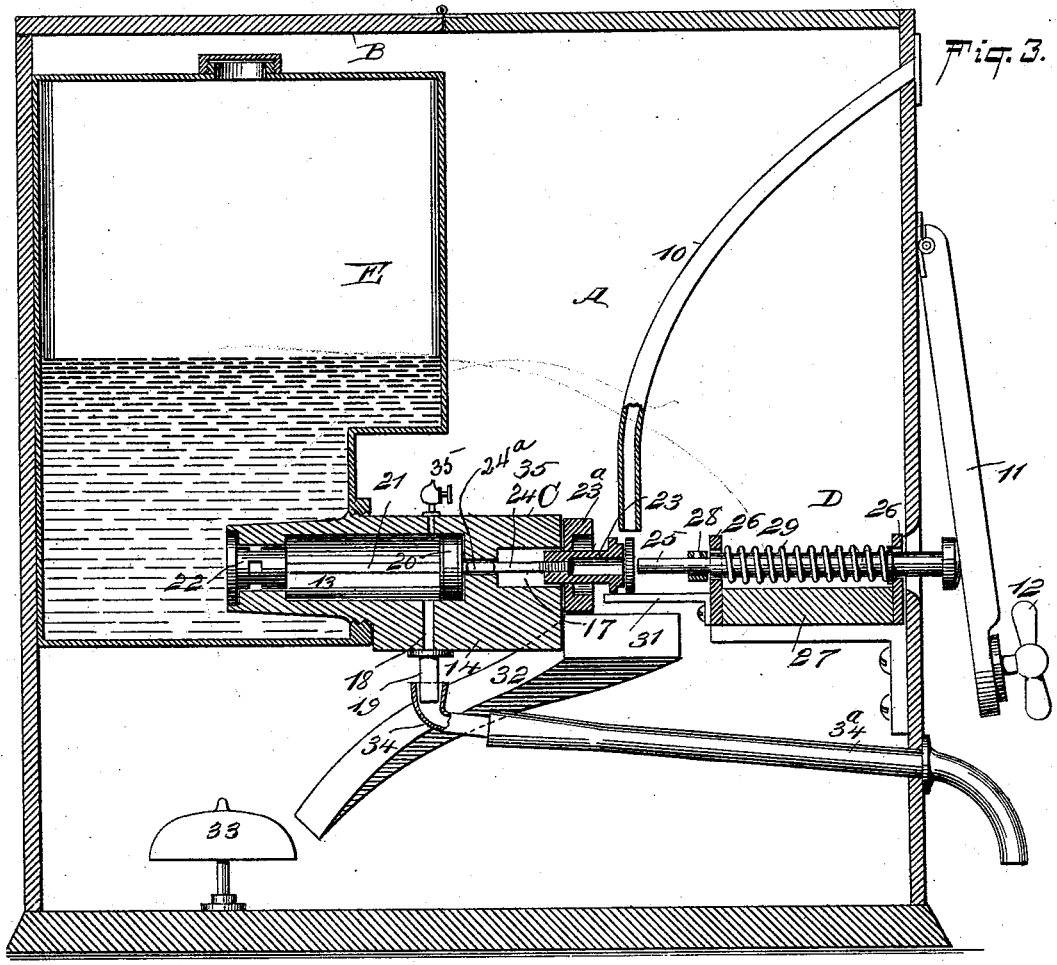
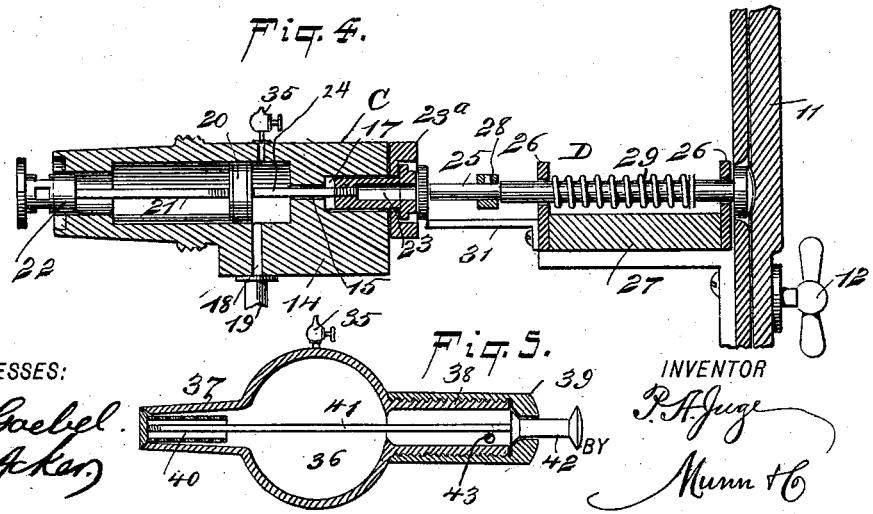
WITNESSES:
William Goebel
J. Fred Acker
INVENTOR
P. A. Juge
BY
Munn & Co
ATTORNEYS.

UNITED STATES PATENT OFFICE.

PIERRE A. JUGE, OF THIBODEAUX, LOUISIANA.

COIN-CONTROLLED APPARATUS FOR DISPENSING LIQUIDS.

SPECIFICATION forming part of Letters Patent No. 540,497, dated June 4, 1895.

Application filed May 10, 1894. Serial No. 510,808. (No model.)

*To all whom it may concern:*

Be it known that I, PIERRE A. JUGE, of Thibodeaux, in the parish of Lafourche and State of Louisiana, have invented a new and Improved Device for Automatically Dispensing Liquids, of which the following is a full, clear, and exact description.

My invention relates to a device for automatically dispensing liquids, the apparatus being set in operation by the suitable introduction therein of a coin of predetermined value.

A further object of the invention is to provide a device through the medium of which beer, liquor, or other liquids may be dispensed in predetermined quantities in an automatic manner, and whereby further the device may be attached readily and expeditiously to a keg of beer, ale, or like liquid, or to a tank or reservoir, or other form of receptacle.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
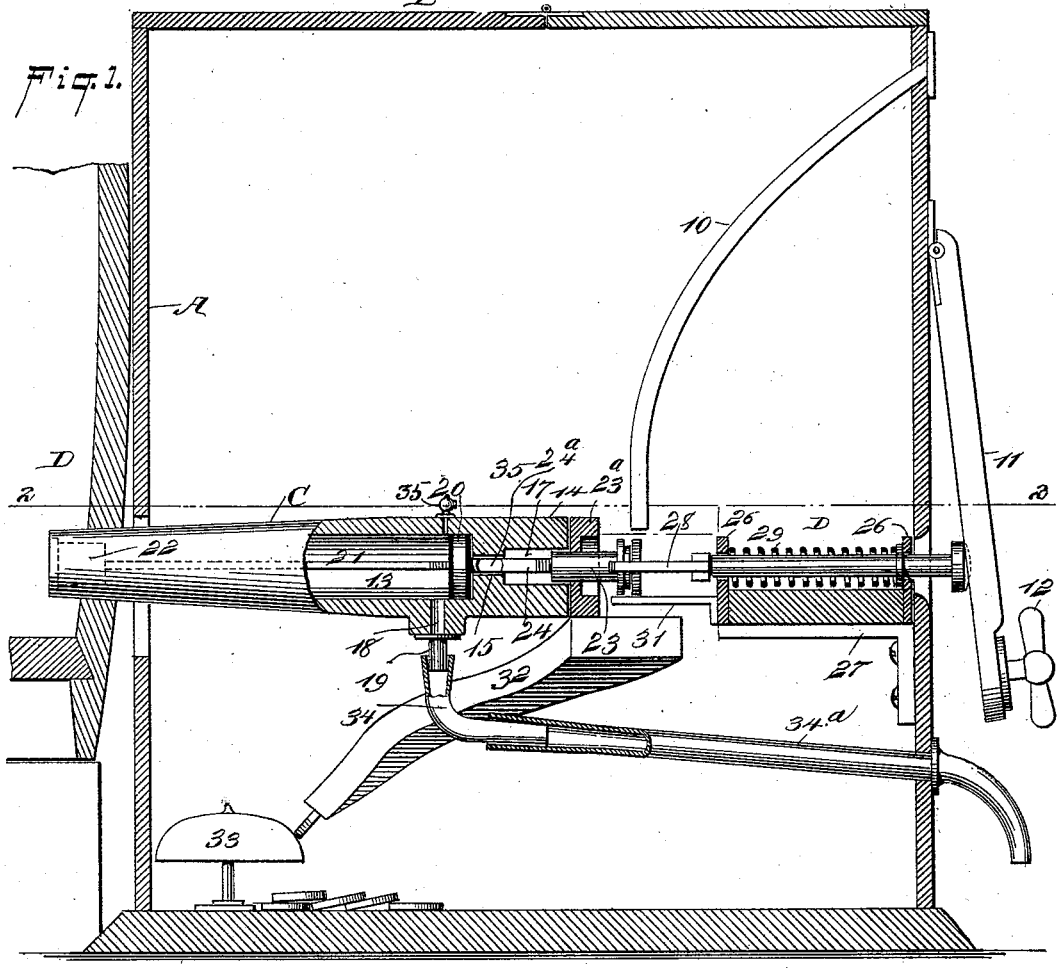
Figure 2:
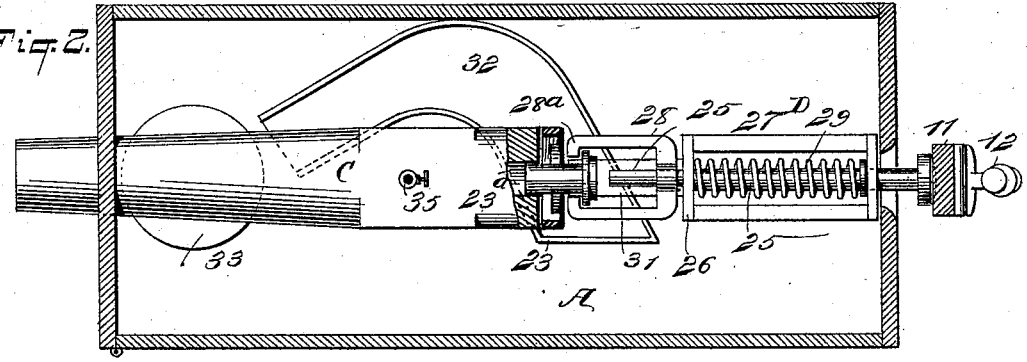

Figure 1 is a vertical section through a portion of a keg and through the device, illustrating the application of one to the other. Fig. 2 is a horizontal section taken essentially on the line 2 2 of Fig. 1. Fig. 3 is a central vertical section through the device, illustrating its application to a tank, the tank likewise being in section. Fig. 4 is a detail sectional view through the operative portion of the device, illustrating the valves opened and the device in position to dispense the liquid; and Fig. 5 is a detail longitudinal section of a modified form of that portion of the device adapted to enter the tank or to be driven into a keg, barrel, or cask.

In carrying out the invention a casing A is employed of essentially box-like construction, the said casing being usually provided with a cover or lid B, whereby access may be gained to the interior of the casing, the said cover being kept normally closed or locked. The casing is provided with a trough 10, which extends out through one face of the casing to a predetermined point, usually to a point at or near its center; and the casing is further preferably provided beneath the mouth of the trough 10 with a lever 11, terminating at its lower or free end in a handle 12. A faucet C, is located within the casing A, adapted to be driven into a keg D when such form of receptacle is employed to contain the liquid to be drawn. This faucet is provided with a barrel body 13, and its head section 14 is preferably made somewhat square, and may be made quite heavy in order that it may receive blows from a mallet or other device without sustaining injury.

The head of the faucet is provided with a channel 15, which connects with the interior of the barrel 13, and as the channel is of less diameter than the barrel a shoulder is formed in the latter. The channel 15 also connects with an opening 17, produced in the end portion of the head of the faucet, as shown in Fig. 1, and an outlet channel 18 is likewise contained in the barrel, communicating with the interior and extending usually through the bottom of the barrel, at which point a pipe 19 having a collar is secured in any improved manner being in direct communication with the said outlet.

A cut-off valve 20, is held to slide in the barrel, being adapted to close the outlet channel 18 when liquid is being received into the barrel. The valve 20 is connected by a rod 21 with a second or inlet valve 22 located at the inner end of the barrel, which valve closes the end of said barrel, or the end adapted to enter a keg; and when the valve 20 closes the outlet 18 the inlet valve 22 will be unseated and will open communication between the barrel of the faucet and the receptacle into which it may be introduced.

A plug 23, is held to slide in the opening 17 in the head of the faucet, and the said plug is provided with a central opening extending longitudinally therein from its outer end, and the plug is further provided with a flange whereby its inward movement is limited. This plug is connected with the cut-off valve 20 through the medium of a rod 24, screwed into the plug and likewise into the valve, and when the faucet is to be driven into a keg or other receptacle the plug 23, under the above construction, is removed from the same; but preferably the plug is loosely fitted into an auxiliary head 23ª, said head having a recess in its outer face, and it is adapted for engagement with the head proper of the faucet. Under this construction the blows in driving the faucet will be delivered upon the auxiliary head, and the plug and valves may be permitted to remain in the faucet, since by pushing the plug backward it may be concealed within the auxiliary head and will not be damaged by blows delivered to the latter, as shown in Fig. 4.

A trip mechanism D employed in connection with the faucet is likewise contained mostly in the casing A. This trip mechanism consists of a rod 25, held to slide in bearings 26, usually attached to a bracket 27 horizontally supported within the casing. The outer end of the rod 25 extends beyond the front of the casing through an opening provided for that purpose, and terminates at its outer end in a head, while the inner end of the rod outside of its inner bracket support is provided with a yoke 28 attached thereto, the body of the yoke being attached to the rod forward of its inner end, as is best shown in Fig. 2; and the said yoke is provided with claws 28ª, adapted to embrace or to receive the flange of the plug 23.

A spring 29, coiled around the trip rod 25 and contained between its bracket supports, serves to normally hold the head of the trip rod a predetermined distance beyond the front of the casing, and also serves to cause the yoke 28 to draw the plug 23 outwardly or forwardly, and maintain the cut-off valve 20 out of engagement with the outlet 18 and the inlet valve 22 in a closed position.

Immediately beneath the yoke 28 a table 31, is located, being usually attached to the bracket 27; and the inner end of the trough 10 adapted to receive a coin is located immediately over the space between the inner end of the trip rod and the opening in the plug 23; and beneath this table a chute 32, is located, which receives the coin after it has performed its work, and the said chute may deliver the coin to the bottom of the casing, or to any receptacle prepared to receive the coin, or may cause the coin to fall in engagement with a gong 33, or like device, and cause an alarm to be sounded. When through the interposition of the coin the cut-off valve is thrown inward, the barrel will receive its charge of liquid, and when the trip mechanism is released the inlet valve will be closed and the outlet 18 opened, as shown in Fig. 1. The liquid contained in the barrel will now pass off through the outlet 18 and pipe 19, and through a forwardly curved pipe 34 detachably connected with the pipe 19 into the delivery pipe 34ª, which is preferably connected by a sliding joint with the pipe 34, the delivery pipe being made to pass out through a wall of the casing.

In order to relieve the interior of the barrel of the faucet from undue pressure a pet cock 35, is located preferably in the top of the barrel, the said pet-cock being in communication with a channel formed in the barrel which leads to a recess 24ª, formed upon the connecting rod 24 uniting the plug with the cut-off valve, as is best shown in Figs. 1 and 3.

It will be understood that the faucet barrel C is not in any way secured in the casing A, but is supported entirely by the keg D into which it is driven.

The apparatus is applied to a keg as follows: The barrel C is first driven into the keg after the manner of beer faucets. Then the casing A is passed over the barrel C by means of the large opening in its rear wall. The yoke 28 will then be coupled to the flange of plug 23 and the pipe 34 will be coupled to the pipe 19. The apparatus will then be ready for operation. When a keg has been emptied, the yoke and pipe 34 will be disconnected from the plug 23 and pipe 19 respectively and the casing will be removed, thus leaving the faucet barrel in the keg from which it may be removed and applied to another keg and the parts again coupled for action as before.

In the operation of this form of the device the trip rod is pushed inward or actuated by manipulating the outer lever 11, namely, by pressing the free end of the lever in direction of the casing, and if a coin of the proper denomination is not placed in the slot or trough 10 the said coin will not enter the space in the yoke 28 prepared to receive it, but will strike the yoke and will drop into the chute and fall within the casing; or, if no coin whatever is placed in the trough 10, and the trip rod 25, is pushed inward, the rod will simply enter the opening in the plug 23 and will not act at all upon the valves 20 and 22. When, however, a coin of proper dimensions is placed in the trough 10, it will enter the yoke 28 between the inner end of the trip rod and the plug, receiving its support upon the table 31, as shown in Fig. 4. When the lever 11 is now manipulated to force the trip rod 25 inward, the said rod will come in engagement with the coin and thus move the plug backward and cause the cut-off valve 20 to close the outlet 18 in the faucet and open the inlet valve 22. Sufficient liquid will then enter the barrel to practically fill the same, and when this filling action of the barrel is brought about, the coin will have passed from the table 31 and dropped into the chute 32. Immediately upon the release of the trip rod from inward pressure it will draw the valve rod 21 forwardly, closing the inlet of the faucet and opening the outlet, whereupon the contents of the faucet will pass out through the delivery pipe 34ª. Thus it will be observed that any amount of liquid may be dispensed, the amount depending upon the capacity of the barrel. It will be furthermore observed that owing to the sliding connection between the delivery pipes 34 and 34ª and the outlet of the faucet, the faucet may be readily removed from a receptacle and placed in position therein without disturbing to any extent the position of the said delivery pipes.

In Fig. 3 I have illustrated a slight modification in the form of the faucet, in which the faucet is adapted to be screwed into or otherwise connected with a tank or reservoir E, located, when used, within the casing A. The operation of this form of the device is the same as that described with reference to the form shown in Figs. 1 and 2.

In Fig. 5 I have shown a further modification of the faucet C, in which the barrel 36 may be made to hold more liquid than in the forms of faucets heretofore mentioned. In this latter modification the body of the barrel is of somewhat globular form, and is provided with two extensions, one from each side, the sides being usually in diametrical alignment. One of the extensions 37, the smaller one, is tapering, and is adapted to enter the keg or tank, while the other extension 38 is larger, and is provided with an exterior thread to receive a sleeve 39, whereby it is strengthened. In this form of faucet a single valve 40 only is employed, located at the end to be placed in the cask. This valve normally closes this end of the faucet, and is connected by a rod 41 with a plug 42 or its equivalent, having movement and likewise a seat in the outer end of the casing. The sleeve 39, is employed in order to strengthen the head portion of the barrel in order that it may receive blows sufficiently heavy to drive the faucet properly. The plug 42 is hollow and is the equivalent of the cylindrical plug 23 heretofore described. The claws of the yoke connected with the trip rod 25 are adapted for engagement with the outer head of said plug. An outlet 43 is provided in the head section of the faucet, connected in the manner heretofore described with the delivery pipes 34 and 34ª. In this form the faucet fills itself first and then empties itself through the outlet 43, which is practically the operation of the other forms of the faucet.

Having thus described my invention, I claim as new and desire to secure by Letters Patent—

1. The combination with a faucet barrel to contain a certain quantity of liquid and adapted to be secured removably to a supply keg or receptacle and be supported thereby, a valve closing the inner end of the barrel, a lateral outlet near its outer end, a valve rod extending through the barrel from end to end and having a second valve normally beyond said outlet and closing it when the rod is moved inwardly to open the inner valve, of a casing or support separate and independent of the faucet barrel and a coin controlled mechanism mounted in said support to operate said valve rod, and also having a separable connection with the rod, whereby the faucet barrel may be uncoupled from its operating mechanism and be attached to and detached from the keg or receptacle, substantially as described.

2. The combination with a faucet barrel to contain a certain charge of liquid and adapted to be secured removably to a supply keg or receptacle and be supported thereby, a valve closing the inner end of the barrel and having a valve rod extending through to the outer end thereof, a second valve on the rod in the outer end of the barrel and a discharge aperture just in rear of the outermost position of the second valve, of a casing or support provided with an off-take pipe separably coupled with the outlet opening in the barrel, and a coin controlled operating mechanism for moving the valve rod inwardly and separably coupled to the outer end thereof, the said casing or support being wholly disconnected from the faucet barrel, substantially as described.

3. The combination with the longitudinally bored faucet barrel adapted to be driven into a beer keg by blows upon its outer end, a valve at the inner end of the barrel and provided with a stem extending outwardly to the opposite end thereof, a second valve on the outer end of the stem, a lateral outlet aperture in rear of the outermost position of said second valve and closed by the inward movement thereof, of a casing having an opening in its rear side through which the faucet barrel may be introduced after having been connected with a keg, an off take or delivery pipe mounted in the casing, and having a coupling to connect with the outlet aperture of the faucet barrel, and a coin controlled operating mechanism mounted in the case and provided with a coupling to connect it detachably with the outer end or head of the valve rod, substantially as described.

4. The combination with the longitudinally bored faucet barrel adapted to contain a certain charge of liquid, and provided at its inner end with a valve seat, of a valve closing against said seat and provided with a rod extending longitudinally through the barrel, a second piston like valve on the stem in the outer end of the barrel bore or chamber, a lateral outlet aperture in the barrel just in rear of the second valve and closed by the inward movement thereof when the rod is moved inward to open the inner end valve, a longitudinally bored head on the outer end of the valve rod and a pet cock, 35, substantially as described.

5. The combination with the longitudinally bored faucet barrel having an outlet 18 and provided at its outer end or head with a longitudinal opening, and a channel connecting the outer end of the bore with said opening, a valve closing the inner end of the barrel and having a rod or stem extending longitudinally therethrough, a second valve on the stem at the outer end of the barrel bore, and a flanged sliding plug working in the said longitudinal opening, and detachably connected with said second valve, of a casing separate and disconnected from the faucet barrel and provided with a coin chute delivering in front of the said sliding plug, a table to support the coin, a slide rod having means for operating it from the outside of the case and extending in alignment with said plug to move it only when a coin is interposed a yoke separably connecting the said operating rod with the flange of the plug, and a delivery pipe extending out of the casing and separably connected at its inner end with the discharge aperture in the faucet barrel, substantially as described.

6. In a coin controlled liquid dispensing apparatus, a measuring faucet having its barrel provided with connected inlet and outlet valves, a longitudinal opening in the outer end of the faucet, a sliding plug mounted therein and connected with the outlet valve, the outer end of the plug being provided with a longitudinal aperture and a flange for connecting it with the operating mechanism, and the auxiliary head $23^a$ at the outer end of the faucet and having an opening through which the plug slides and a recess to receive the plug flange when the faucet is being driven into a keg, substantially as described.

PIERRE A. JUGE.

Witnesses:
S. T. GRISAMORE,
R. R. MCBRIDE.